United States Patent [19]
Lee et al.

[11] Patent Number: 5,018,140
[45] Date of Patent: May 21, 1991

[54] REFRAME CIRCUIT IN A SYNCHRONOUS MULTIPLEXING DEVICE

[75] Inventors: Bhum C. Lee; Kwon C. Park; Bong T. Kim, all of Daejeon, Rep. of Korea

[73] Assignees: Electronics and Telecommunications Research Institute, Daejon; Korea Telecommunications Authority, Seoul, both of Rep. of Korea

[21] Appl. No.: 448,805

[22] Filed: Dec. 11, 1989

[30] Foreign Application Priority Data

Dec. 14, 1988 [KR] Rep. of Korea ............... 16773

[51] Int. Cl.$^5$ ............................................. H04J 3/06
[52] U.S. Cl. ........................... 370/105.1; 370/100.1; 375/116
[58] Field of Search ............... 370/105, 105.1, 100.1, 370/106; 375/114, 116, 108, 111, 112

[56] References Cited

U.S. PATENT DOCUMENTS

| | | | |
|---|---|---|---|
| 3,903,371 | 9/1975 | Colton et al. | 375/116 |
| 3,940,563 | 2/1976 | Susset | 375/116 |
| 4,016,368 | 4/1977 | Apple, Jr. | 375/116 |
| 4,404,675 | 9/1983 | Karchevski | 375/116 |
| 4,747,116 | 5/1988 | Yajima et al. | 375/116 |
| 4,748,623 | 5/1988 | Fujimoto | 370/105.1 |

Primary Examiner—Douglas W. Olms
Assistant Examiner—Alpus H. Hsu
Attorney, Agent, or Firm—Blakely, Sokoloff, Taylor & Zafman

[57] ABSTRACT

A reframe circuit in a synchronous multiplexing device comprising a frame synchronizing pattern detection circuit, a frame pattern bit error detection circuit responsive to a serial data stream from the frame synchronizing pattern detection circuit, an in-frame/out-of-frame state discrimination circuit responsive to the output signal from the frame pattern bit error detection circuit and the output signal from the synchronizing pattern detection circuit, a counter phase synchronizing circuit responsive to the output signal from the in-frame/out-of-frame state discrimination circuit, the output signal from the frame synchronization pattern detection circuit and a reference phase signal, and a counter and timing generation circuit responsive to the operating mode control signal from the counter phase synchronizing circuit.

5 Claims, 4 Drawing Sheets

5,018,140

REFRAME CIRCUIT IN A SYNCHRONOUS MULTIPLEXING DEVICE

BACKGROUND OF THE INVENTION

The present invention relates to a reframe circuit in a synchronous multiplexing device and more particularly, to a reframe circuit which maintains in the in-frame state for a long period of time even though the error rate on a transmission line is high, and minimizes the time required to detect an out-of-frame state for regaining the in-frame state in the out-of-frame state, resulting in minimization of information loss of received, multiplexed data streams.

In a digitalized telephone and data transmission network, frame synchronization performance of multiplexing device including a switching system and a transmission system which construct the network is an important parameter on which data transmission quality depends. Frame synchronization performance of the synchronous multiplexing device mainly depends on the performance of the reframe circuit and the synchronization performance of the reframe circuit depends on data transmission rates, a frame repetition period, overheads for frame synchronization, line conditions, etc. Accordingly, any common reframe circuit providing frame synchronization performance satisfyingly to all the multiplexing devices has not yet been developed.

SUMMARY OF THE INVENTION

An object of this invention is to provide a reframe circuit representing optimum synchronization performance under the condition of data transmission rate of 65.536 Mbps and frame repetition period of 8 KHz which are used especially in a switching system data link so as to improve transmission performance of data passing the data link.

Another object of this invention is to provide a reframe circuit having excellent synchronization performance at nonstandized transmission rates for using in a synchronous multiplexing circuit having a transmission rate and a frame repetition period similar to the above.

Accordingly, in order to accomplish the above objects and solve such conventional problems, this invention provides a reframe circuit comprising a frame synchronizing pattern detection means for detection whether a frame synchronizing pattern in a received data stream is the same as a predetermined synchronizing pattern, for providing the result thereof as an output signal and for providing an output signal in an out-of-frame state;

a frame pattern bit error detection means responsive to a serial date stream from the frame synchronizing pattern detection means for comparing the serial date stream with the predetermined serial frame pattern, for detecting bit error in the data stream, for guarding whether the detected bit error exceeds an error threshold value and for providing the result thereof as an output signal;

an in-frame/out-of-frame state discrimination means responsive to the output signal from the frame pattern bit error detection means and the output signal in the out-of-frame state from the frame synchronizing pattern detection means, for discriminating in an in-frame state, as a normal inframe state if the error in the frame synchronizing signal train is less than or equal to the error threshold, for discriminating in an in-frame state, as a pre-alarm state if the error exceeds the error threshold and for discrimination in an in-frame state, as the out-of-frame state when the error exceeds the error threshold continuously more than a predetermined number of times, and for guarding in the out-of-frame state, whether the predetermined frame synchronizing signal train is detected at a position of the next frame signal expected from the detected frame synchronizing pattern, for being processed in the frame pattern search steps (B through H) determining whether the detected frame synchronizing pattern is produced accidentally, and then for providing the result as an output signal;

a counter phase synchronizing means responsive to the output signal from the in-frame/out-of-frame state discrimination means, the output signal from the frame synchronizing pattern detection means and a reference phase signal, for providing as an output signal a parallel loading mode for fixing phase while operating in the in-frame state and a count-up mode for counting until the state becomes to the in-frame state while operating in the out-of-frame state; and a counter and timing generation means responsive to the operating mode control signal from the counter phase synchronizing means, for operating in the parallel loading mode or in the count-up mode for generating timing signal in accordance with each of the operation modes and then for supplying them to each of the means and a system classifying the received multiplexed data.

BRIEF DESCRIPTION OF THE DRAWINGS

This invention will be further understood from the following description with reference to the accompanying drawings, in which.

DETAILED DESCRIPTION OF THE PREFERRED EMBODIMENT

Figure 1:
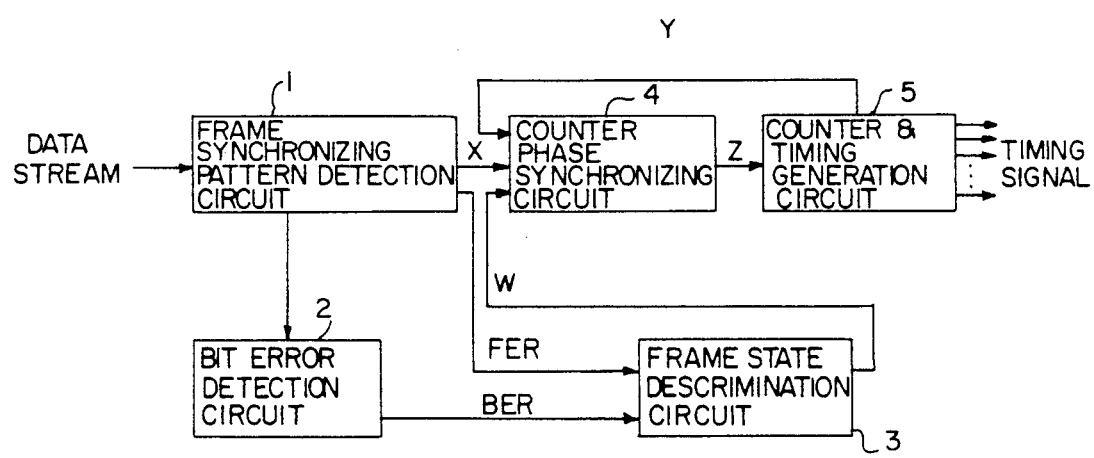
FIG. 1 is a schematic block diagram illustrating the structure in accordance with an embodiment of this invention.

FIG. 1 is a schematic block diagram in accordance with an embodiment of this invention. In FIG. 1, "X" is an output representing the detached results from a frame synchronizing pattern detection circuit (1), "Y" is a reference phase information from a counter and timing generation circuit (5), "W" is an output from a in-frame/out-of-frame state discrimination circuit (3), "Z" is an output from a counter phase synchronizing circuit (4). FER is another output from the frame synchronizing pattern detection circuit (1) representing whether a predetermined synchronizing pattern is detected in out-of-frame state and BER is another output from frame pattern bit error detection circuit (2). The frame synchronizing pattern detection circuit receives a data stream, detects whether a synchronizing pattern in the data stream is the same as the predetermined synchronizing pattern, provides to the counter phase synchronizing circuit (4) the output signal "X" which becomes "0" if the synchronizing pattern is the same as the predetermined synchronizing pattern and if not, becomes "1", and also provides to the in-frame/out-of-frame state discrimination circuit (3) the output signal FER which in the out-of-frame state becomes "0" when the predetermined synchronizing pattern is detected and otherwise, becomes "1", and also provides the received data stream in serial to the frame pattern bit error detection circuit (2).

the frame pattern bit error detection circuit (2) has the function of transmitting to the in-frame/out-of-frame state discrimination circuit (3) the output BER which becomes "0" when the error value of the serial data stream from the frame synchronizing pattern detection circuit (1) exceeds the error threshold value and otherwise, becomes "1". the in-frame/out-of-frame state discrimination circuit (3) receives the output FER indicating the result detected in the out-of-frame state from the frame synchronizing pattern detection circuit (1) and the output BER from the frame pattern bit error detection circuit (2). In the in-frame state, the in-frame/-out-of-frame state discrimination circuit (3) discriminates as a normal synchronizing mode when the bit error value of the frame pattern is less than or equal to the error threshold value so as to make the output signal "W" to "0", discriminates as a pre-alarm state when the bit error value of the frame pattern exceeds the error threshold value so as to make the output signal "W" to "0", and discriminate as an out-of-frame state when the bit error of the frame pattern exceeds continuously the error threshold value over a predetermined number of times so as to make output signal "W" to "1", and then provides the signal "W" to the counter phase sychronizing circuit (4).

In the out-of-frame state, the in-frame/out-of-frame state discrimination circuit (3) guards whether the predetermined frame synchronizing signal train is detected at a position of the next frame signal which can be expected from the position of the guarded frame synchronizing signal train, and after the 7 identifying steps (FIG. 5), discriminates whether the detected frame pattern was produced accidentally, and if so, returns to the first frame pattern search step and if not, discriminates as an in-frame state so as to cause the output signal "W" to be "0" (logic zero) provides the signal "W" to the counter phase synchronizing circuit (4).

the counter phase synchronizing circuit (4) receives the output "X" indicating the result of the detection of the synchronizing pattern from the frame synchronizing pattern detection circuit (1), the output signal "W" from the in-frame/out-of-frame state discrimination circuit (3) and the reference phase information "Y" from the counter and timing generation circuit (5) and provides a control signal which causes the counter and timing generation circuit(5) to operate in either a parallel loading mode or a count up mode.

The counter and timing generation circuit (5) receives the output "Z" from the counter phase synchronizing circuit (4). If "Z" is "0", i.e., in the in-frame state, the counter operates in a parallel loading mode, which causes the phase of the counter to be synchronized with that of "X", resulting in maintaining the in-frame state and also provides the synchronized timing signal to a system which classifies the received multiplexed data.

IF "Z" is "1", i.e., in an out-of-frame state, the counter operates in the count-up mode, continues to count until the state changes into the in-frame state and also provides to the system the timing signal necessary to recover to the in-frame state.

Figure 2:
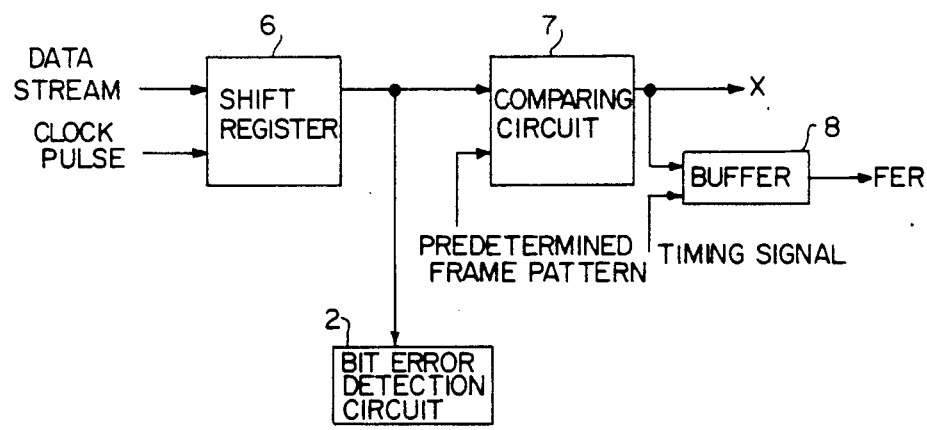
FIG. 2 is a detailed block diagram illustrating the structure of frame synchronizing pattern detection means.

Detailed construction and operating relationship of each of the above circuits will be further described with reference to FIGS. 2 to 4. FIG. 2 is a detailed block diagram illustrating the structure of the frame synchronizing pattern detection circuit (1). The frame synchronizing pattern detection circuit (1) includes a shift register (6), a comparing circuit (7) and a buffer (8). The shift register (6) receives a data stream and a clock pulse reproduced from the data stream and sends them to the comparing circuit (7) while shifting each of them by one bit.

The comparing circuit (7) receives the shifted data stream from the shift register (6), compares the data stream with the predetermined synchronizing pattern and provides to the counter phase synchronizing circuit (4) the output signal "X" which becomes "0" if the frame synchronizing pattern which is the same as the predetermined synchronizing pattern is detected in the data stream and otherwise, becomes "0", and also provides to the frame pattern bit error detection circuit (2) the data stream from the shift register (6) in serial. The buffer (8) receives the timing signal from the counter and timing generation circuit (5) and provides to the in-frame/out-of-frame state discrimination circuit (3) the output FER which becomes "0" if the synchronizing pattern is detected during operation in the out-of-frame state and otherwise, becomes "1".

Figure 3:
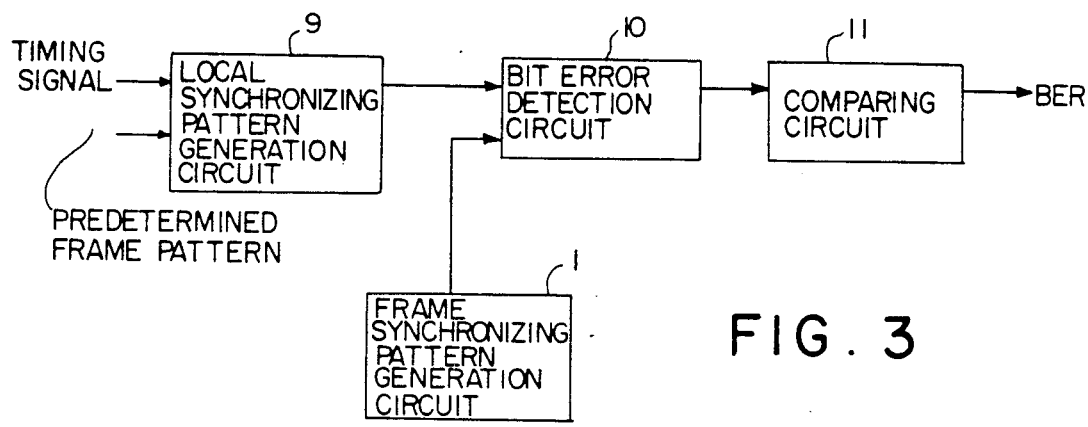
FIG. 3 is a detailed block diagram illustrating the structure of the frame pattern bit error detection means.

FIG. 3 is a detailed diagram illustrating the structure of the frame pattern bit error detection circuit (2). The frame pattern bit error detection circuit (2) includes a local synchronizing pattern generation circuit (9), a bit error detection circuit (10), and an error threshold value (Eth) comparing circuit (11).

The local synchronizing pattern generation circuit (9) receives a predetermined 16 bit frame signal and the controlled timing signal from the timing ganeration circuit (5) and provides the predetermined synchronizing pattern to the bit error detection circuit (10).

The bit error detection circuit (10) receives the predetermined synchronizing pattern from the local synchronizing pattern generation circuit (9) and a shifted data stream from the shift register (6) in the frame synchronizing detection circuit (1), compares the detected frame synchronizing signal train with the predetermined synchronizing pattern so as to detect bit errors, and then provides the detected result to the error threshold value-comparing circuit (11).

The error threshold value comparing circuit (11) compares the bit error value to the predetermined error threshold value and provides to the in-frame/out-of-frame state discrimination circuit (3) the output signal BER which becomes "0" if the bit error value exceeds the error threshold value and otherwise, becomes "1".

Figure 4:
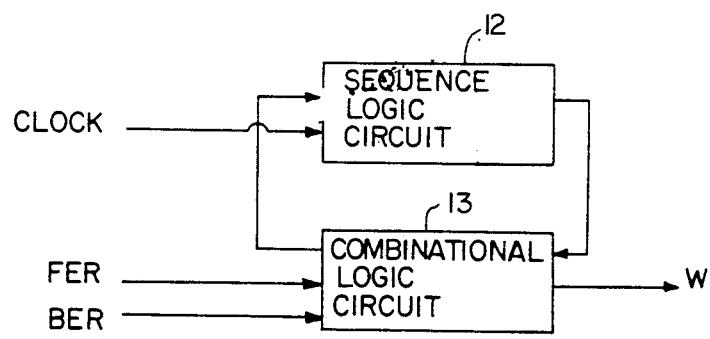
FIG. 4 is a block diagram illustrating the structure of the in-frame/out-of-frame state discrimination means.

FIG. 4 is a detailed block diagram illustrating a structure of the in-frame/out-of-frame state discrimination circuit (3). The in-frame/out-of-frame state determination circuit (3) includes a sequence logic circuit (12) and a combinational logic circuit (13). The sequencial logic circuit (12) receives FER and BER through the combinational logic circuit (12) and timing signals. Performs the function of the state transition between the in-frame state and the out-of-frame, determines whether it is in the in-frame state at a certain moment and provides the discriminated result as an output signal "W" through the combinational logic circuit (12). The steps for performing the function of state transition of the sequential logic circuit (12) will be further described by way of example with reference to the flow diagram illustrated in FIG. 5.

Figure 5:
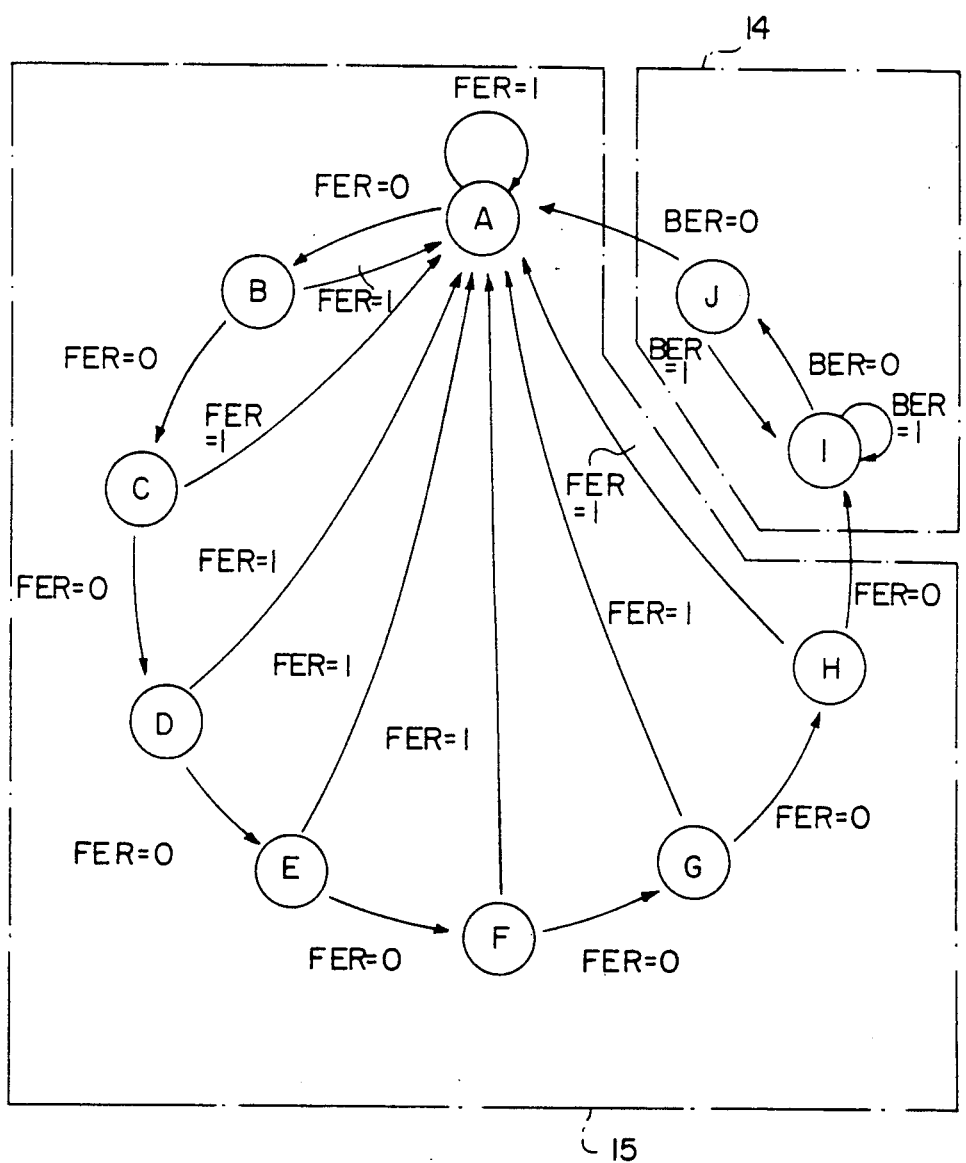
FIG. 5 is a flow diagram illustrating state transitions of in-frame/out-of-frame state.

FIG. 5 is a flow diagram illustrating the steps discriminating the in-frame/out-of-frame state in a switching system data link. In the drawing, A is a search state in the out-of-frame state (15), B to H are each an identifying state in the out-of-frame state (15), "I" is a normal synchronizing state in the in-frame state (14) and "J" is a pre-alarm state in the in-frame state (14). A state transition in the out-of-frame state (15) is determined on the base of the state FER and a state transition in the in-frame state is determined on the base of the state of BER.

A period of time rquired for a state transition is a frame period. In switching system data link, the frame synchronizing pattern uses a 16 bit and the error threshold value of the frame synchronizing pattern is 2. In the out-of-frame state (15), the in-frame/out-of-frame state discrimination circuit (3) discriminates as an in-frame recovery state if it detects a corrct frame synchronizing signal train for 8 consecutive frame periods i.e., FER is continuously "0" for 8 times and the output signal "W" thus becomes "0" which represents the in-frame state (14). In the in-frame state (14), the in-frame/out-of-frame state discrimination circuit (3) discriminates as an out-of-frame state if equal to or greater than a bit error are detected for 2 consecutive frame periods the 16 bit synchronizing pattern signal train and the output "W" thus becomes "1". Accordingly, in the in-frame state (14), the normal in-frame state (I) if the maintained if the received frame synchronizing pattern is the same as the predetermined synchronizing pattern and the frame pattern bit error value is equal to or less than 2, and at that time, the output "W" thus becomes "0"; is the synchronizing pattern bit error value exceeds 2, BER becomes "0" though the synchronizing pattern is the same as the predetermined synchronizing pattern, and thus the transition state is converted into the pre-alarm state (J), and the state is maintained near to the out-of-frame state; if the bit error value exceeds 2, at the state (J), the state is discriminated as the out-of-frame state (15), since it is lasted for 2 consecutive frames "W" thus becomes "1" and the procedures finding out a phase information on a new synchronizing signal train is performed promptly and if the permittable error value does not exceeds the error threshold, the in-frame state is maintained for a long period of time and minimizes the loss of the received data.

In the out-of-frame state (15), after detecting whether the frame synchronizing pattern in the received data stream is the same as the predetermined synchronizing pattern, if so, FER becomes "0" so as to convert the state into the indentifying states "B" to "H", which are the states identifying whether the received frame synchronizing pattern is the same as the predetermined synchronizing pattern accidentally; if the received frame synchronizing pattern is the same as the predetermined synchronizing pattern for 8 consecutive frame periods, the state is discriminated as a normal in-frame state (14) so as to be converted into a normal in-frame state (I), thus preventing from discriminating as a synchronizing state by mistake if the received frame synchronizing pattern is the same as the predetermined synchronizing pattern accidentally due to errors on the signal line, and otherwise, FER becomes "1" and returns to the state A and the above steps will be repeated.

There is ten steps in the state transition courses, and the sequence logic circuit (12) needs at least 4 flipflops and can be constructed using proper elements in accordance with the flow diagram of the state transitions in the drawing.

Figure 6:
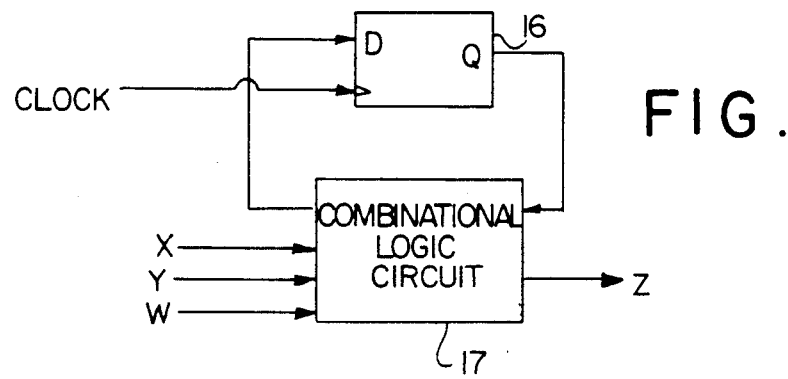
FIG. 6 is a block diagram illustrating the structure of the counter phase synchronizing means.

FIG. 6 is a block diagram of the structure of the counter phase synchronizing circuit (4). The counter phase synchronizing circuit (4) comprises a D flipflop (16) and a combinational logic circuit (17) which receives signals "X", "Y" and "W" provides the counter control signal "Z": in accordance with the 3 inputs. If "Z" is "0", the circuit (4) causes the counter and timing generation circuit (5) to operate in a parallel loading mode and if "Z" is "1", the circuit (4) causes the counter and timing generation circuit (5) to operate in a count-up mode, so as to cause the phase of the counter to be identical with that of the synchronizing pattern of the received data.

Figure 7:
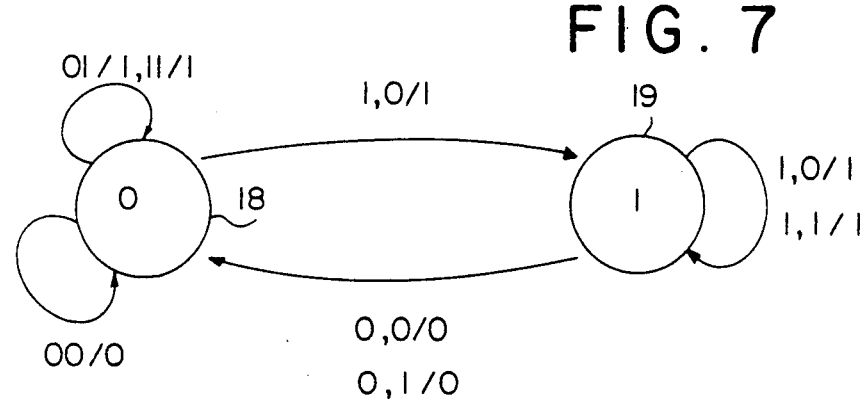
FIG. 7 is a diagram illustrating state transitions of counter phase synchronizing means.

The steps for performing the above functions will be described with reference to the flow diagram of FIG. 7. FIG. 7 shows an example of the flow diagram illustrating state transitions for performing the function of the counter phase synchronizing circuit (4) which is constructed using a D flipflop and a combinational logic circuit (17). FIG. 18 represents that an output "Q" of the "D" flipflop (FIG. 6) is "0" and 19 represents that the output "Q" of the "D" flipflop is "1".

If "Z" is "0", it causes the counter and timing generation circuit (5) to operate in the parallel loading mode and fixes the phase of the counter (14) (FIG. 5) to that of "X" so as to cause the in-frame state to be maintained, and if "Z" is 1, it causes the counter and timing generation circuit (5) to operate in the count-up mode which is the operating mode in the out-of-frame state and the counter (14) (FIG. 5) continues to count until the state is converted into the in-frame state after the received frame synchronizing pattern which is the same as the predetermined synchronizing pattern is detected continuously for more than 8 times.

If "W" is "0", i.e., the in-frame/out-of-frame state discrimination circuit (3) discriminates as the in-frame state (14), "X" becomes "0", "Y" becomes "0" and thus "Z" becomes "0" so as to control the counter and timing generation circuit in the parallel loading mode; and if "W" is 1, i.e., the in-frame/out-of-frame state discrimination circuit (3) discriminates as the out-of-frame state (15), the state in which the D flipflop has been maintained and "X", "Y" and "Z" are changed so as to control the counter pursuant to the result thereof.

For example, in a state where "W" is "1" and an initial state of the "D" flipflop is "0", if "X" and "Y" is "0" and "1" respectively, the "D" flipflop is maintained at "0" and Z becomes "1", and if "X" and "Y" is "1" and "0" respectively, the D flipflop is changed into "1" state and "Z" remains as "1". Accordingly, "Z" is changed in accordance with "X" and "Y" and the operating mode of the counter and timing generation circuit (5) is determined depending on "Z".

Figure 8:
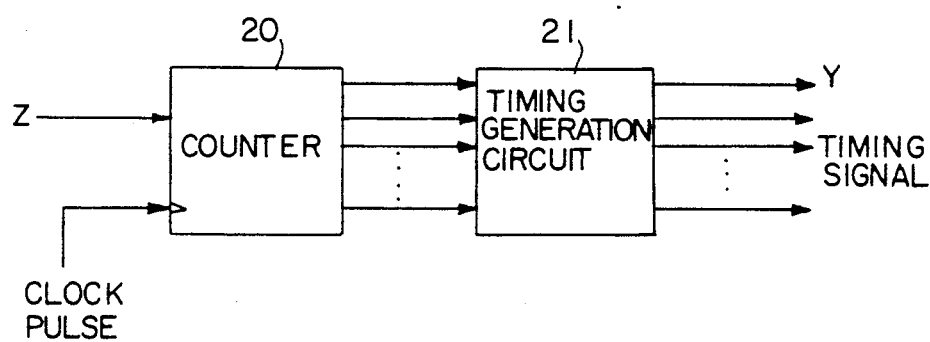
FIG. 8 is a block diagram illustrating the structure of the counter and timing generation means.

FIG. 8 is a block diagram illustrating a structure of the counter and timing generation circuit (5). The counter and timing generation circuit (5) includes a counter (2) and a timing generation circuit (21). The counter (20) receives a clock pulse reproduced from the received data bit stream and the control signal Z from the counter phase synchronizing circuit (4) and operates in the parallel loading mode or the count-up mode.

In the parallel loading mode, the reference phase is fixed to the phase of "X" and thus the in-frame state is maintained, and in the count-up mode, the counter (20) counts up continuously until the state becomes the in-frame state. The timing generation circuit (21) generates a timing signal according to the operating modes of the counter (20).

This invention is constructed as described above and can be used extentively in a synchronous multiplexing circuit for transmitting a multiplexed bit train into which the frame synchronizing information is inserted. Particularly, when the reframe circuit in accordance with this invention is used in a matching apparatus similar to a switching system data link, the reframe circuit represents the best performance so as to minimize the information loss. Especially, since the frame synchronizing algorithm is simple, the construction of the circuit is facilitated. Since the operations in the in-frame mode and the out-of-frame mode are determined by different factors, the in-frame state is maintained for a long period of time though the error rate in the transmission line is comparatively high.

The circuit also promptly detects the change of the phase in the synchronizing signal train and fixes the phase of the counter and timing generation circuit to a new phase of the synchronizing signal train so as to remarkably improve the data transmission quality.

Until now, many kinds of reframe circuits have been devised and used which have excellent synchronizing performance in the standized transmission rate. However, since there has not been any reframe circuit which can be used generally in the non-standized transmission rate, the reframe circuit which was devised to be used only in the standized transmission rate has resulted in the deterioration of the synchronizing performance.

However, when using the synchronizing algorithm proposed in this invention, the reframe circuit having an excellent synchronizing performance is obtained.

What is claimed as:

1. A reframe means in a synchronous multiplexing device comprising: a frame synchronizing pattern detection means for detecting whether a frame synchronizing pattern in a received data stream is the same as a predetermined synchronizing pattern, for providing the result thereof as a first output signal (X) and for providing a second output signal (FER) in an out-of-frame state;

a frame pattern bit error detection means responsive to a serial data stream from the frame synchronizing pattern detection means, for comparing the serial data stream with a predetermined serial frame pattern, for detecting bit error in the data stream, for guarding whether the detected bit error exceeds an error threshold value (Eth) and for providing the result thereof as an output signal (BER);

an in-frame/out-of-frame state discrimination means responsive to the output signal (BER) from the frame pattern bit error detection means and the second output signal (FER) in the out-of-frame state from the frame synchronizing pattern detection means, for discriminating in an in-frame state, as a normal in-frame state (I) if the error in a frame synchronizing signal train is less than or equal to the error threshold (Eth), for discriminating in an in-frame state, as a pre-alarm state (J) if the error exceeds the error threshold (Eth) and for discriminating in an in-frame state, as the out-of-frame state when the error exceeds the error threshold continuously more than a predetermined number of times, and for guarding in the out-of-frame state, whether a predetermined frame synchronizing signal train is detected at a position of the next frame signal expected from the detected frame synchronizing pattern, for being processed in a frame pattern search steps (B through H) determining whether the detected frame synchronizing pattern is produced accidentially, and then for providing the result as an output signal (W);

a counter phase synchronizing means responsive to the output signal (W) from the in-frame/out-of-frame state discrimination means, the first output signal (X) from the frame synchronizing pattern detection means and a reference phase signal (Y), for providing as an output signal (Z) a parallel loading mode for fixing phase while operation in the in-frame state and a count-up mode for counting until the state becomes the in-frame state while operation in the out-of-frame state and;

a counter and timing generation means responsive to an operating mode control signal (z) from the counter phase synchronizing means, for operating in the parallel loading mode or in the count-up mode, for generating a timing signal in accordance with each of the operating modes and then for supplying them to each means and a system classifying a received multiplexed data.

2. The reframe means of claim 1, wherein the frame synchronizing pattern detection means comprises:

a shift register responsive to the received data stream and a clock pulse reproduced from the received data stream for providing the received serial bit stream with shifting by one bit;

a comparing means for providing the shifted data stream from the shift register to the frame pattern bit error detection means and the first output signal (X) which is a result of the detection of a predetermined synchronizing pattern signal train to the counter phase synchronizing means and;

a buffer (8) responsive to the first output signal (X) from the comparing means (7) and a timing signal for providing the second output signal (FER) which is a result of the detection of the predetermined synchronizing pattern in the out-of-frame state.

3. The reframe circuit of claim 1, wherein the frame pattern bit error detection means comprises:

a local synchronizing pattern generation means responsive to a timing signal and the predetermined frame synchronizing pattern for generating the predetermined synchronizing pattern signal train;

a bit error detection means for comparing the predetermined synchronizing pattern signal train from the local synchronizing pattern generation means and a frame signal train from the frame synchronizing pattern detection means and for providing a bit error value; and an error threshold comparing means (11) for discriminating whether the bit error value detected from the bit error detection means exceeds the predetermined error threshold value (Eth) and for providing the result thereof to the in-frame/out-of-frame state discrimination means.

4. The reframe circuit of claim 2, wherein the shift register is a 16 bit shift register and the comparing circuit stores a predetermined 16 bit pattern signal train so as to compare a signal train with a shifted 16 bit parallel data from the shift register in a pulse period, and provides the first output signal (X) as "0" in the pulse period only.

5. The reframe circuit of claim 3, wherein the error threshold comparing means provides the output signal (BER) which is "0" when the bit error value exceeds the error threshold value (Eth) of 2 and is "1" when the bit error value is less than or equal to the error threshold value of 2.

* * * * *

UNITED STATES PATENT AND TRADEMARK OFFICE
CERTIFICATE OF CORRECTION

PATENT NO. : 5,018,140
DATED : May 21, 1991
INVENTOR(S) : Lee et al.

It is certified that error appears in the above-identified patent and that said Letters Patent is hereby corrected as shown below:

In column 2 at line 20 the phrase which begins "a counter and timing generation means ..." should also begin a new paragraph.

In column 3 at line 14 change "the" to --The--;
at line 20 change "the" to --The--;
at line 51 change "the" to --The--.

In column 4 at line 65 change
"signals. Performs" to --signals, performs--

UNITED STATES PATENT AND TRADEMARK OFFICE
CERTIFICATE OF CORRECTION

PATENT NO. : 5,018,140
DATED : May 21, 1991
INVENTOR(S) : Lee et al

It is certified that error appears in the above-indentified patent and that said Letters Patent is hereby corrected as shown below:

In column 5 at line 18 change "rquired" to --required--; at line 24 change "corrct" to --correct--.

Signed and Sealed this

First Day of August, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,018,140
DATED : May 21, 1991
INVENTOR(S) : Lee et al.

It is certified that error appears in the above-indentified patent and that said Letters Patent is hereby corrected as shown below:

On the title page item [73], delete

" Electronics and Telecommunications
Research Institute, Daejon; Korea
Telecommunications Authority,
Seoul, both of Rep. of Korea  "

insert:

-- Electronics and Telecommunications
Research Institute, Daejon; Korea
Telecommunication Authority,
Seoul, both of Rep. of Korea --

Signed and Sealed this

Twenty-third Day of January, 1996

Attest:

BRUCE LEHMAN

*Attesting Officer*     *Commissioner of Patents and Trademarks*